W. BERWALD.
MIRROR SUPPORT.
APPLICATION FILED JUNE 18, 1921.
1,419,804.
Patented June 13, 1922.
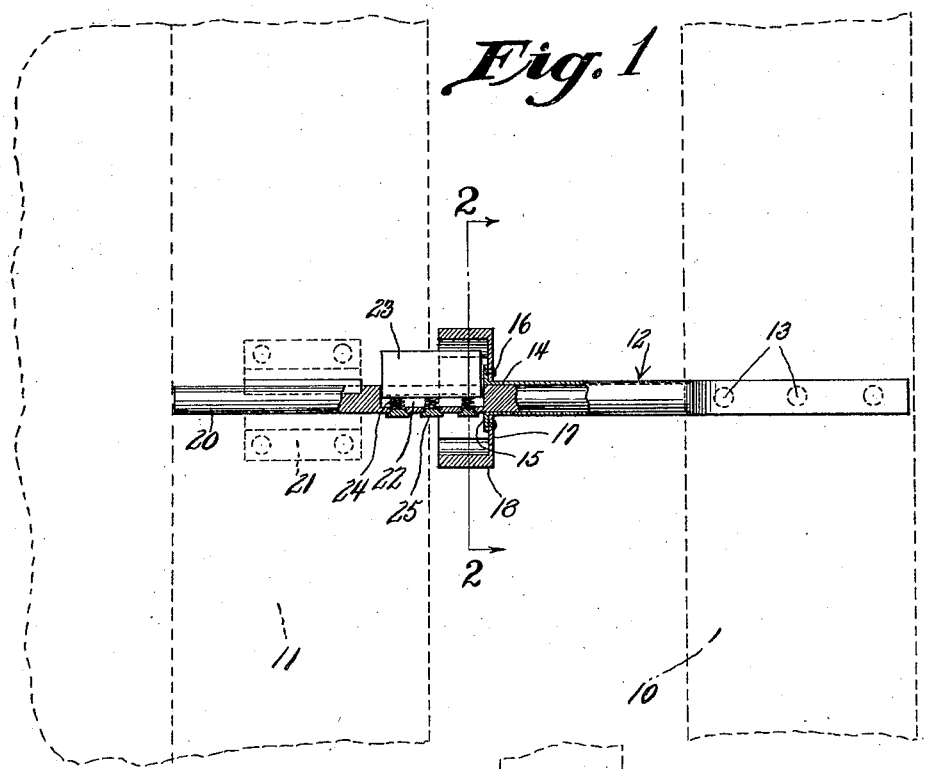
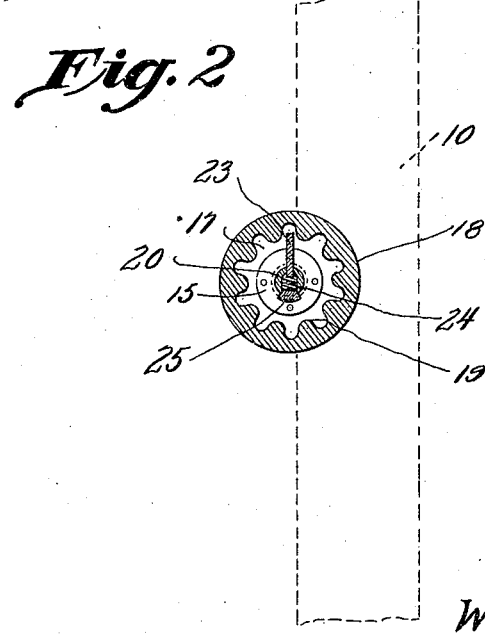
Inventor
William Berwald,
By J. R. Kelly, Attorney

UNITED STATES PATENT OFFICE.

WILLIAM BERWALD, OF BABBITT, MINNESOTA.

MIRROR SUPPORT.

1,419,804.  Specification of Letters Patent.  Patented June 13, 1922.

Application filed June 18, 1921. Serial No. 479,159.

*To all whom it may concern:*

Be it known that I, WILLIAM BERWALD, citizen of the United States, residing at Babbitt, in the county of St. Louis and State of Minnesota, have invented certain new and useful Improvements in a Mirror Support, of which the following is a specification.

The present invention relates to improvements in mirror supports and more particularly to a support which will allow free tilting movement of the mirror yet provide for retaining the same in certain tilted positions.

Various other objects and advantages will become apparent during the continuance of the following description.

Figure 1 represents a view in elevation of my invention as in use in connection with a mirror; parts thereof being shown broken away and in section.

Figure 2 is a view in cross section of my invention taken on line 2—2 of Figure 1.

In its present embodiment my invention is shown in connection with a dresser standard 10 and a mirror 11 of conventional form. It is to be understood however that I am not limited to this particular application of my invention.

My invention consists generally of an arm 12 which is carried by the standard 10 as at 13, the inner and free end of which is recessed to provide a socket 14. The arm 12 further carries, at its inner end, a peripheral flange 15 to which is secured as at 16 the inwardly directed flange 17 of an annular collar 18. On its inner periphery the collar 18 is provided with a series of inwardly directed teeth 19 preferably of the form shown in Figure 2.

The mirror 11, or rather the framework thereof carries an outwardly projecting pin 20 as at 21, one end of the pin being positioned within the socket 14 of the arm 12. This arrangement permits free tilting movement of the mirror.

Intermediate its ends the pin 20 is provided with a longitudinal slot or recess 22 in which is arranged a plate-like pawl 23 for engagement with the teeth 19 of the collar 18. In order to retain the pawl in yielding engagement with the said teeth springs 24 are arranged in the base of the slot or recess 22, as shown in Figures 1 and 2. Consequently it will be seen that when released the pawl being seated between certain of the teeth 19 will retain the mirror in a set position but that by applying a slight pressure to the mirror it may be tilted as desired either forwardly or rearwardly.

If desired pin 20 may be equipped with suitable removable closures 25 whereby access may be had to the recess 22 for the purpose of removing the springs 24 or substituting others in place thereof. However this arrangement is not necessary or essential to the proper operation of the device since a leaf spring may be inserted in the recess 23 in place of the coil spring. It is further pointed out that the mouth of the slot or recess 22 need only be wide enough to receive the pawl 23 since if it should be of greater width than the width of the pawl tilting of the pawl laterally with respect to the longitudinal axis of the pin 20 would result thus impairing the proper operation of the device.

What is claimed is:—

1. The combination with a fixed standard and a movable frame, of a pair of telescopic members, one fixed to the said support and the other to the movable frame, whereby one member may move longitudinally with respect to the other, a collar carried by the free end of one of the telescopic members and provided with circumferentially spaced teeth, a slidable pawl engageable with the teeth, the end of the movable member adjacent the said collar being recessed to receive the said sliding pawl, and a resilient element in contact with the pawl to normally urge the latter into engagement with the teeth.

2. A mirror support comprising an arm fixed at one end to a standard and recessed at its free end to provide a socket, a pin having one end positioned within the socket of the arm and its other end fixed to a mirror-frame, said arm and pin having axial turning movement relative to each other and said pin being recessed adjacent the free end of the arm, a collar fixed to the arm and overhanging the said recess, said collar having a series of circumferentially spaced pawl-seats on the under side of the overhanging portion and parallel to the said recess, and a spring thrust locking pawl normally projecting from the recess and engaging in one of the said pawl-seats for locking the parts against rotation, said pawls being accessible from one side of the collar for releasing purposes.

In testimony whereof I affix my signature.

WILLIAM BERWALD.